NOISE SUPPRESSION AND SENSITIVITY CONTROL CIRCUIT

Filed March 9, 1959 3 Sheets-Sheet 1

INVENTOR.
GIUSEPPE ZANARINI
BY
Irwin V. Thompson
ATTY.

March 5, 1963 G. ZANARINI 3,080,450

NOISE SUPPRESSION AND SENSITIVITY CONTROL CIRCUIT

Filed March 9, 1959 3 Sheets-Sheet 2

INVENTOR.
GIUSEPPE ZANARINI
BY
Irwin S. Thompson
ATTY.

March 5, 1963 G. ZANARINI 3,080,450

NOISE SUPPRESSION AND SENSITIVITY CONTROL CIRCUIT

Filed March 9, 1959 3 Sheets-Sheet 3

INVENTOR.
GIUSEPPE ZANARINI
BY
Irwin S. Thompson
ATTY.

United States Patent Office 3,080,450
Patented Mar. 5, 1963

3,080,450
NOISE SUPPRESSION AND SENSITIVITY CONTROL CIRCUIT

Giuseppe Zanarini, 6 Via Avellino, Turin, Piedmont, Italy
Filed Mar. 9, 1959, Ser. No. 798,022
Claims priority, application Italy Mar. 20, 1958
4 Claims. (Cl. 178—7.3)

As is well known, three important functions in a modern television receiver set are represented by the automatic cancellation of the synchronization perturbations, as well as by the automatic adjustment of sensitivity and the adjustment of contrast. Each of these functions should ideally fulfill certain requirements, among which chiefly are the following requirements.

The automatic cancellation of the synchronization perturbations should intervene to arrest the electron flow in the separator tube upon arrival of a disturbing pulse just exceeding the peak level of the synchronization signals; the automatic adjustment of sensitivity should be strongly amplified and further act on the radio frequency stages only when the incoming signal exceeds a predetermined minimum level; the adjustment of contrast should act—upon any displacement of the control—always within the working adjustment range in which no distortion of the reproduced images occurs.

In practice, in the usual circuits no sufficient approximation to the ideal requirements has been attained hitherto, inasmuch as these circuits must operate under essentially variable conditions and each of the functions thereof will modify the conditions of the others. Good results may be attained only through commercially unacceptable complications and by means of highly critical circuits of difficult setup and adjustment, which are adapted to solve each of the various problems separately.

This invention has the object of providing a solution of unitary character for these problems, namely such as to create a close interdependence between the functions mentioned above as well as to ultize this interdependence in order to ensure operation of said circuits always in the most favourable conditions, so that it will be possible—with simple and commercially economical means—to fulfill the requirements desired in a satisfactory manner. More particularly, according to the invention it is of fundamental importance to establish an interdependence between the functions of suppression of the disturbing pulses and of automatic sensitivity adjustment, while additionally—although most advantageously—the adjustment of contrast will be also included in this unified assembly.

The invention will now be explained in more detail with reference to the accompanying drawings, which show some circuit diagrams illustrating the arrangement and functional correlation of the various circuit parts.

Figure 8:
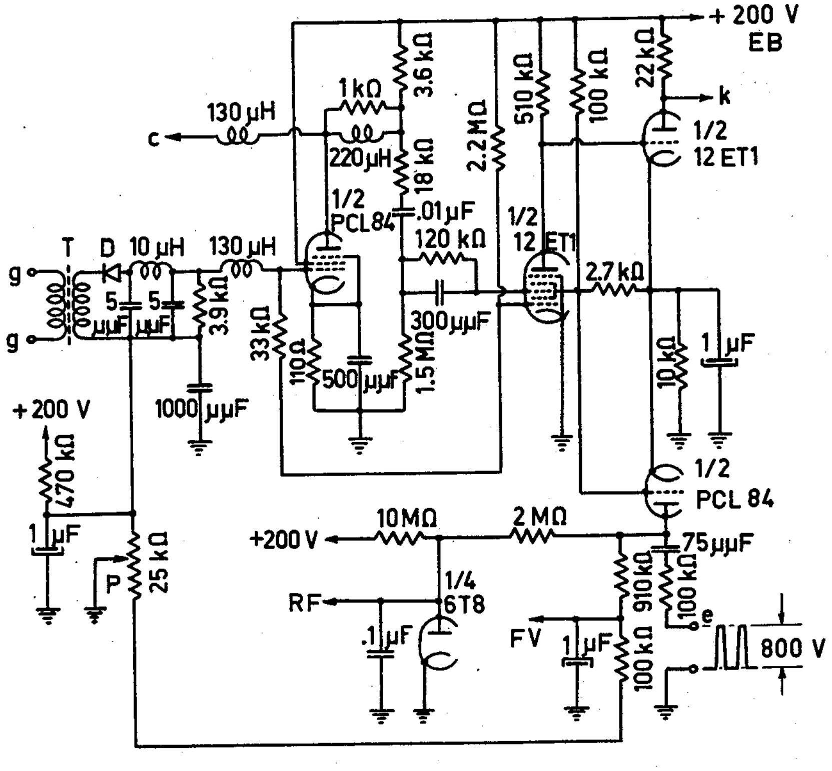
Figure 7:
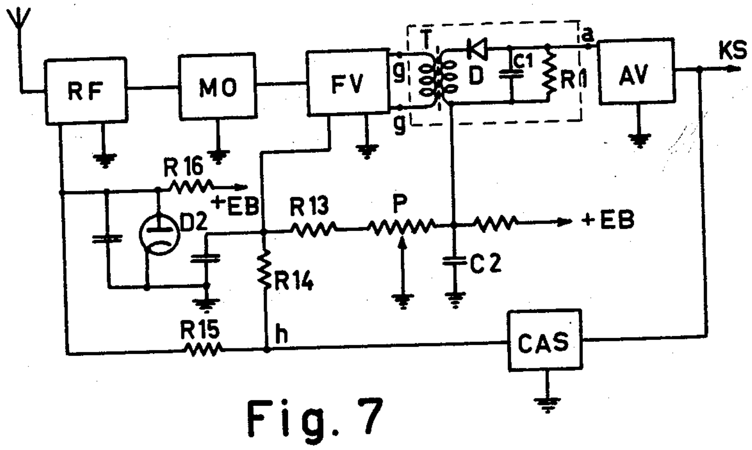

FIG. 7 shows how the contrast adjustment control way also govern the delivery, to the intermediate video frequency stages, of a fraction of the voltage produced for the automatic sensitivity control, and FIG. 8 finally shows a more detailed diagram of the assembly comprising the contrast adjustment control, the circuit of automatic sensitivity adjustment and the circuit for suppression of pulse perturbations, unified in accordance with the invention.

Figure 1:
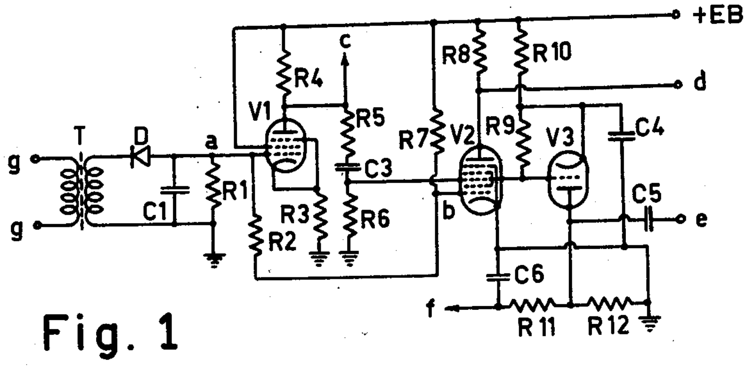
FIG. 1 shows diagrammatically the establishment of the basic co-operation between the perturbation cancellation and the automatic adjustment of sensitivity.

With reference to FIG. 1, the interdependence between the circuits for cancellation of pulse perturbations and the circuits for automatic sensitivity adjustment is attained by utilizing pulse variations of voltage at the first grid of the separator tube, which occur in correspondence with the synchronizing pulses of the signal received when the circuit is in the condition of maximum cancellation readiness. In order to control the automatic sensitivity adjustment, said pulse variations of voltage, suitably amplified and phase-reversed, will control with their amplitude the circuits for automatic adjustment of sensitivity, so as to steadily maintain the level of the output synchronized signals from the video detector extremely close to the threshold level of activity of the noise switch. Thus, while the automatic sensitivity control—strongly amplified—will always maintain the perturbation suppression circuit in the condition of maximum readiness of response, the latter will in turn deliver the control signal required to the automatic sensitivity adjustment circuit; the operations of the two circuits thereby mutually integrating one another.

Still referring to FIG. 1, T is the last intermediate frequency transformer, to whose terminals *g*—*g* the signal from the last intermediate video frequency amplifier stage is fed. The transformed signal is detected by the video detector diode D, whose load resistance is indicated by R1, while C1 provides for levelling off the high frequency. The means for contrast adjustment, which will be described in detail hereinbelow, are not shown in FIG. 1. The pentode V1 is the single-stage video-frequency amplifier; for simplicity, the various units for response correction have been omitted. Pentode V1 is cathode biased by R3, while its anode is connected with the positive voltage $+E_B$ throughout the resistor R4, as well as with the electrode *c* for Kinescope control and, through a series assembly R5—C3, with the third grid of a multiple-grid tube V2 acting as a separator, and operating in a noise switch circuit. The first grid *b* of tube V2 is connected to the point *a* (input to the video amplifier) through a resistor R2, and to the positive voltage $+E_B$ through a resistor R7; it is essential that $R7 \gg R2 \gg R1$. Biasing of the third grid is ensured by resistor R6, whereas resistor R8 constitutes the anode load of V2, at whose anode there appear—as is well known—the separate synchonization signals. Up to this point the circuit being described is substantially known. If at point *a* (input to the video amplifier) there arrives a signal like that of FIG. 2*a*, then at point *c* (output of the video amplifier) there will appear the signal of FIG. 2*c*, which is similar to the first-mentioned one but phase-reversed, while at point *b* there will appear a series of short negative pulses (FIG. 2*b*) simultaneous with the synchronization signals, which are nearly entirely transferred from point *a* as soon as the current flowing through resistor R2 becomes equal to the current in resistor R7. To this condition there corresponds the maximum readiness of intervention by the circuit; in the known circuits this is however a particular condition, since for variations of the level of the synchronization signals—though slight they may be—the small pulses at point *b* will disappear, or the circuit becomes self-suppressing, thereby preventing operation of the receiver. On the contrary, in accordance with what will be set forth below, in the circuit according to the invention, this is the normal condition of operation, and this explains why the circuit described is always in the best condition for operation, which cannot practically be attained or maintained in the circuits known heretofore.

Figure 2:
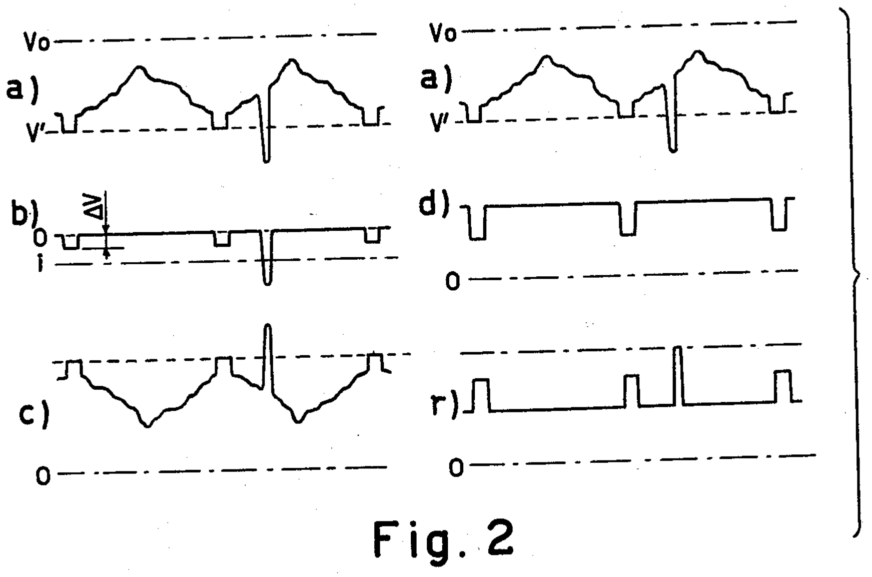
FIG. 2 shows the waveform of the signals present in various points of the circuit according to FIG. 1.

According to FIG. 1, the load resistance of the screen grids (2nd and 4th) of tube V2 is subdivided into the series resistors R9 and R10. Since the third grid operates—with respect to the two screen grids—by distribution of current, the current in R9 is controlled by the voltage of the first grid, and therefore across R9 there will appear—amplified and phase-reversed—the pulses of the signal at *b* (FIG. 2*r*).

The triode V3 has the function of amplifying the automatic sensitivity control and must produce the negative voltage required for the control of one or more radio-frequency or intermediate-frequency amplifier stages, preceding the video detector. Through C5 the triode V3 receives from *e* (connected with the line transformer) positive voltage pulses of sufficiently high potential, simultaneous with the synchonization pulses; R12 is the anode load of V3, and downstream of the filter R11—C6, the voltage for automatic sensitivity control is present. Triode V3, instead of being governed by the detected or amplified video signal, as usual, is controlled by the aforementioned pulses which are present at *b*, suitably amplified and phase-reversed. Accordingly to FIG. 1, this is accomplished by utilizing the amplification of V2 between the first grid and the screen grids, and therefore the triode V3 is connected with its cathode (shunted to ground, for variable current, by capacitor C4) and with its grid at the ends of resistor R9. The latter must have a value such as to cause the current flowing therethrough, at absence of the pulses in *b*, to produce a voltage drop sufficient to cut off the triode V3, which instead will become conducting in correspondence with and as a function of the pulses which periodically appear at *b*. In the absence of these pulses (as for instance when the incoming signal is excessively weak) the triode V3 will never conduct the current; across R12 there will develop an alternating potential difference which is levelled off by the filter R11—C6, the sensitivity control remains inactive and the receiver reaches its maximum sensitivity. If now it is assumed that the incoming signal increases in value, at a certain moment there will appear the small pulses at point *b*; in correspondence therewith, as aforesaid, the triode V3 will become conductive, thereby permitting establishment of a continuous component of voltage across R12, which component will act through the automatic sensitivity control so as to prevent any further increase of the signal at *a*. Since the sensitivity control is governed by the pulses at *b*, which are amplified by V2 and then further by V3, the result will be a strongly amplified control, and therefore the pulses present at *b* will vary very slightly in amplitude, even upon large variations of the incoming signal. The arrangement must be such that, even for incoming signals of the maximum possible amplitude, the pulses at *b* will never be able to cut off the tube V2, and this condition is easily fulfilled in practice by virtue of the large amplification provided by the automatic sensitivity control.

On account of the foregoing, whatever the amplitude of the incoming signal may be and however the contrast may be adjusted, the signal at *a* will be always stabilized at a level such as to generate small periodical pulses at *b*, so that if a pulse perturbation should occur, it surely will cut off the tube V2, even if it exceeds very slightly the level of the synchronization signals.

Quantitatively, the pulses at *b* appear at the moment in which the currents $I_2$ in R2 and $I_1$ in R7 (assumed to be both positive when directed toward *b*) will take opposed algebraic signs and equal absolute value, namely when $+I_2=-I_7$ By neglecting the difference of potential produced by the space charge of electrons between the cathode and the first grid of V2, and being $v'$ the voltage—negative with respect to ground—of the synchronization pulse level at *a*, there will be $I_2=v'/R2$, while $I_T=E_B/R7$, so that the level $v'$, in correspondence with the pulses appearing at point *b*, has the value:

$$v'=E_B.R2/R.7$$

On the other hand, since the grounded side of the detector is maintained by P at the voltage $v$, the amplitude of the detected signal will be $v''=v_0+v'=v_0+E_B.R2/R7$. When the detected signal exhibits, in correspondence with the synchronization signals, an increment or excess $\Delta V$ with respect to the level $v'$ just calculated, this excess will be entirely or substantially transferred to *b* (since $R2 \ll R7$), thereby bringing about the operation of the system described above and stabilizing the amplitude of the detected signal at the value thus reached. On account of the high amplification of the automatic sensitivity control, this increment or excess $\Delta V$ will have an approximately constant value, which is small as compared to $v''$ also for large variations of the incoming signal.

The circuit of the noise switch does not comprise any impedance coil and therefore its time-constant is practically zero. For this reason, it will be able to maintain its efficiency unaltered even in presence of prolonged trains of perturbing pulses.

A fully analogous operation can be obtained with a circuit modified in accordance with an alternative embodiment of the invention. In this case, the signal present at *b* is not amplified by utilizing the amplification of V2 between the first grid and the screen grids, but this is accomplished in a separate tube whose grid is connected with *b*, while its anode is fed with the voltage $+E_B$ through two resistors in series, at the ends of one of which there is connected in this case a triode V3. The operation is identical with that shown in FIG. 1, except that in the present instance there exists a greater possibility of choice for the amplification and the values of the resistances. In this case, the amplification may be chosen still greater than in the preceding case, if desired.

The adjustment of contrast in a circuit such as that shown in FIG. 1 cannot be accomplished in the usual manner by varying the black level in the video signal detected, but must be made according to other known methods which will not influence such level. However, as stated above, it is possible to unify with the foregoing also the contrast control, thereby attaining several advantages, which will be set forth hereinbelow. This implies a departure from the usual principle of coincidence between the white level of the video signal detected and the ground voltage, while rendering instead adjustable the white level between the ground voltage and a determined positive voltage, while the black level of the video signal detected is kept constant by the action of the automatic sensitivity adjustment described above. Thus, there is obtained the adjustment of contrast in a manner compatible with the above circuit and, as will be seen below, also a co-operation between the circuits will be attained, as well as the possibility of establishing a deeper collaboration thereof.

Figure 3:
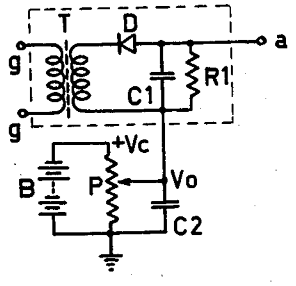
FIG. 3 shows a new means proposed for obtaining adjustment of contrast.
Figures 4, 6:
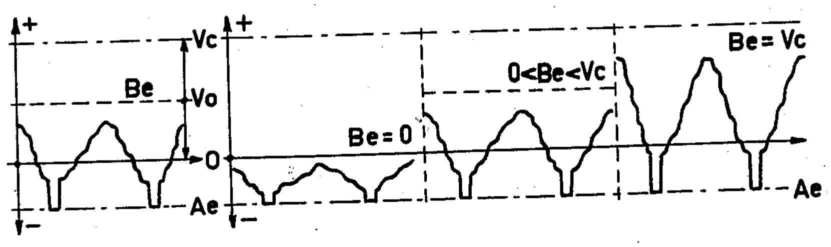
FIG. 4 shows a diagrammatic exemplification of a detected video signal.
FIG. 6 shows how the detected signal varies with the contrast adjustment accomplished according to FIG. 3.
Figure 5:
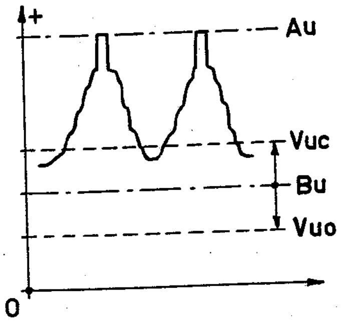
FIG. 5 shows the output signal from the video amplifier which receives the signal of FIG. 4.

According to the simplified diagram of FIG. 3, the grounded side of the video-detector—corresponding per se to FIG. 1—instead of being connected to ground as usual, is connected with the slider of a potentiometer P, between whose terminals, one of which is connected to ground, a fixed D.C. voltage V*c* is applied, whose source is shown as the battery B. The grounded side of the video-detector is therefore brought—depending on the adjustment of potentiometer P—to a positive voltage V*o*, the value of which will be between zero and V*c*. The cathodic bias of the video-amplifier tube will in turn be chosen equal or near to V*c*. As a result (see FIG. 4), the white level B*e* of the detected signal will be coincident with the voltage V*o* and adjustable between zero and V*c*; further (FIG. 5), the white level B*u* of the detected signal will be also variable between two values V*uo* and V*uc*, whereas the peak level of both the detected synchronization signals A*e* and the amplified signals A*u* will remain constant by virtue of the automatic sensitivity adjustment. By adjusting the position of potentiometer P, therefore, the amplitude of both the detected and the amplified signal will be caused to vary with consequent variation of the contrast. This is illustrated in FIG. 6, wherein the detected signal is shown as follows: at the left hand side, as it is in conditions of minimum contrast (with the potentiometer slider connected to ground); at the middle, in conditions of medium contrast; at the right hand side, in conditions of maximum contrast (with the potentiometer slider brought to the positive end). Of course, in practice the battery B is replaced by a voltage divider connected between ground and a point at a positive voltage of sufficiently high value, the potentiometer being part of said voltage divider. An important advantage obtained with this circuit resides in the fact that the contrast adjustment potentiometer is energized only D.C. current and can be spaced apart from the remaining circuits without any inconvenience due to the length of the connections. Further, the whole range of the potentiometer P corresponds to the variation of contrast from a minimum to a maximum of predetermined value and suitably chosen, which is independent of the intensity of the received signal and of the other adjustments, thereby avoiding the necessity of further adjustments as well as the risk of image distortions deriving from wrong contrast adjustment. This is the result of the co-operation of the contrast adjustment control just described with the circuit mentioned above; in fact, with reference to what has been set forth hereinbefore concerning the quantitative relations governing the appearance of the pulses at point *b*, it is found that the amplitude at which the detected signal becomes stabilized is variable depending on the position of the slider of potentiometer P, and therefore according to the value taken by the voltage $V_c$, comprised between zero and $V_c$, said amplitude varying correspondingly between the minimum value $$\Delta V + E_B.R2/R7$$

and the maximum value $$\Delta V + E_B.R2/R7 + V_c$$

A suitable arrangement will result in a coincidence of these values with the extreme ones of the contrast adjustment range practically interesting and admissible in the adjustment of the television receiver set.

Finally, a more complete unification can be established among the three functions discussed above, by allotting to the contrast adjustment control also the function of determining the fraction of the automatic sensitivity adjustment voltage acting on the intermediate video frequency stages for regulating the amplification, while the excess of automatic adjustment voltage—with respect to a suitably established threshold—will act on the radio-frequency stages. By varying the ratio defining the voltage fraction just mentioned, in accordance with the contrast adjustment, it will be possible to obtain the best operation of the automatic sensitivity adjustment circuit, whatever the signal received may be and for any setting of the television receiver, thereby ensuring in any case the proper intervention on the radio-frequency stages.

This is practically obtained with unusually simple means by connecting in the divider circuit of the automatic sensitivity adjustment voltage that portion of the potentiometer which is cut off from the contrast adjustment. The corresponding simplified diagram is shown in FIG. 7, wherein the blocks RF, MO, FV, AV, CAS, indicate the radio-frequency stages, the mixer-oscillator stage, the intermediate video-frequency stages, the video amplifier and the automatic sensitivity adjustment circuit respectively. The slider of potentiometer P is connected to ground, and its right hand section (according to FIG. 7) operates in a manner identical to FIG. 3, in order to bring a voltage $V_o$, adjustable between zero and a positive maximum value to, the grounded side of the video detector. The left hand section of the potentiometer is instead connected in series to the resistors R13, R14, thereby forming a voltage divider which allots to the amplification adjustment of the intermediate video-frequency stages a greater or smaller fraction of the adjustment voltage produced by the circuit CAS and present at the point *h*. On the other hand, the excess of this voltage at *h* with respect to a threshold established by the resistors R15, R16 and by the diode D2 will act on the radio-frequency stages, thereby moderating their amplification as soon as the incoming signal becomes so intense as to possibly produce saturation of the subsequent stages. The result obtained is that the action of the circuit CAS on the radio-frequency stages will be independent of the contrast adjustment, whereas the action on the intermediate frequency stages is regulated by the contrast control itself, and a suitable arrangement will provide for any position of the contrast control, the most convenient ratio for the operation of the automatic sensitivity control, without necessity of operating any other auxiliary control.

Quantitatively, such ratio of the control voltage produced by the automatic sensitivity adjustment circuit, to the fraction utilized for controlling the amplification of the intermediate frequency stages, will vary between the value $(R13+R14+P)/(R13+P)$ (in correspondence with the maximum contrast) and the value $(R13+R14)/R13$ (in correspondence with the minimum contrast. This is on the assumption that the value of R16 is high enough, as will be generally the case.

FIG. 8 finally shows a detailed diagram of the portion of a TV receiver set comprising the contrast control, the automatic sensitivity adjustment control and the noise switch, fully unified as embodied herein. It also shows the main response correction components, omitted in the preceding figures, and there are also indicated the values of the components—however merely by way of example, inasmuch as they must of course vary in any particular case depending on the characteristics of the television receiver set. In FIG. 8, the tube PCL84 (pentode section) corresponds to the tube VI of FIG. 1, the tube 12ET1 (pentode section) to the tube V2, and the tube PCL84 (triode section) to the tube V3. From the point FV there is derived the voltage for the automatic sensitivity control of the intermediate video frequency amplifier stages, while from the point RF is derived the voltage for the automatic sensitivity control of the radio-frequency amplifier stages; from point *k* the amplified synchronization signal is sent to the corresponding circuits. In the practical circuit of FIG. 8 there is shown a particular possibility of connection of the automatic sensitivity control amplifier tube PCL84 (triode section), which in this case is connected at the ends of a resistor extending from the screen grid of the separator tube 12ET1 (pentode section) to the cathod of the synchronization amplifier tube 12ET1 (triode section), while another resistor connects the screen grids directly with the anode voltage. The tube 12ET1 (triode section) is the amplifier tube for synchronizing signals, and it is connected in a substantially normal way. With its cathodic biasing resistor, this tube constitutes a voltage divider which delivers, at the cathode of the tube, a D.C. positive voltage of a predetermined value. The cathod of the amplifier tube for automatic sensitivity control is connected to the cathode of the amplifier tube for the synchronizing signals, with the purpose of making use of this positive voltage, without requiring an independent voltage divider. This arrangement permits selection of the most suitable value of the D.C. voltage which normally cuts off the amplifier tube PCL84 (triode section) of the automatic sensitivity control, while maintaining to the most convenient value the amplification coefficient of the pulses corresponding to the synchronizing signals which in accordance with the invention govern the operation of the sensitivity control.

Having thus described my invention, what I claim and desire to protect by Letters Patent, is:

1. In a television receiver set, a circuit for suppression of synchronization disturbances and for automatic sensitivity control, comprising a video detector for detecting the complete signals received, a first tube connected to said video detector for amplifying said detected signals, means including a second tube connected to said video detector and to said first tube for separating the synchronizing signals contained in said detected signals and for suppressing synchronization disturbances, said second tube having a cathode, a first grid for receiving said detected signals, at least one screen grid, a third grid for receiving the signals amplified by said first tube, and an anode, means including an amplifier and phase-inverter circuit for amplifying and inverting the portion of the signals applied to said first grid of the second tube which corresponds to the synchronizing signals, said amplifier and phase-inverter circuit including the cathode, the first grid and the screen grid of said second tube, and a means including a third tube connected to the screen grid of said second tube and included in the automatic sensitivity control circuit of the receiver for regulating the amplification of the radio-frequency and intermediate-frequency stages of said receiver, whereby said first tube delivers the amplified video signals, said second tube delivers at the anode the synchronizing signals separated and free from disturbances, and delivers at the screen grid voltage pulses corresponding to the synchronizing signals, said voltage pulses controlling said third tube, and said third tube regulates the amplification of said radio-frequency and intermediate-frequency stages of the receiver so as to stabilize the level of said voltage pulses and thereby of the synchronizing signals.

2. A circuit as set forth in claim 1, further comprising a fourth tube connected to said second tube for amplifying said separated synchronizing signals, said fourth tube including a cathode, a first resistor connected between ground and said cathode of the fourth tube, a second resistor connected between said cathode of the fourth tube and said screen grid of the second tube, said third tube comprising a cathode connected to said cathode of the fourth tube and a control grid connected to the screen grid of said second tube, whereby the current of said fourth tube flowing through said first resistor causes a positive voltage to be applied to the cathodes of said fourth and third tubes for biasing said third tube, and the voltage pulses delivered by the screen grid of said second tube control said third tube.

3. A circuit as set forth in claim 1, further comprising a resistor connected to a first side of said video detector and to the first grid of said second tube, a capacitor connected to the second side of said video detector and to ground, a source of positive voltage, and a potentiometer for contrast adjustment connected to said second side of the video detector, to ground and to said positive voltage source, whereby the regulation of said potentiometer causes the voltage of said second side of the video detector to vary between zero and a positive maximum voltage.

4. A circuit as set forth in claim 1, further comprising a resistor connected to a first side of said video detector and to the first grid of said second tube, a capacitor connected to the second side of said video detector and to ground, a source of positive voltage, a resistor connected to said second side of the video detector and to said positive voltage source, a potentiometer for contrast adjustment having a first terminal, a second terminal and a slide, said slide being connected to ground, said first terminal being connected to said second side of the video detector, said third tube having an anode, a voltage divider connected to said anode of the third tube and to said second terminal of the potentiometer and having an intermediate point, connection means connected to said intermediate point of the voltage divider for controlling the amplification of the intermediate-frequency stages of the receiver, a diode having an anode connected to said anode of the third tube and having a cathode connected to ground, and connection means connected to said anode of the diode for controlling the amplification of the radio-frequency stages of the receiver.

References Cited in the file of this patent

UNITED STATES PATENTS

| | | |
|---|---|---|
| 2,736,769 | Macovski | Feb. 28, 1956 |
| 2,803,701 | Clark | Aug. 20, 1957 |